(12) United States Patent
Ngo et al.

(10) Patent No.: US 9,517,772 B1
(45) Date of Patent: Dec. 13, 2016

(54) ELECTRONIC SPEED CONTROL FOR LOCOMOTIVES

(71) Applicant: Caterpillar Inc., Peoria, IL (US)

(72) Inventors: Khanh Ngo, Peoria, IL (US); Cody Ryerson, Peoria, IL (US); Joshua Fossum, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 5 days.

(21) Appl. No.: 14/722,831

(22) Filed: May 27, 2015

(51) Int. Cl.
*B60W 30/188* (2012.01)
*B60W 10/06* (2006.01)
*B60W 10/184* (2012.01)
*B61C 15/00* (2006.01)

(52) U.S. Cl.
CPC ............ *B60W 30/188* (2013.01); *B60W 10/06* (2013.01); *B60W 10/184* (2013.01); *B61C 15/00* (2013.01); *B60W 2510/0604* (2013.01); *B60W 2510/0638* (2013.01); *B60W 2510/0657* (2013.01); *B60W 2710/0644* (2013.01)

(58) Field of Classification Search
CPC .. B60W 30/188; B60W 10/06; B60W 10/184; B60W 2510/0638; B60W 2510/0604; B60W 2510/0657; B60W 2710/0644; B61C 15/00; B60T 8/17
USPC ...................................... 701/19, 20; 303/188
See application file for complete search history.

(56) References Cited

U.S. PATENT DOCUMENTS

| | | | | |
|---|---|---|---|---|
| 4,394,739 A | * | 7/1983 | Suzuki ................. | B60K 31/105 123/352 |
| 5,014,202 A | * | 5/1991 | Thatcher ................. | B60T 8/175 180/197 |
| 5,058,013 A | * | 10/1991 | Iwatsuki ............... | B60W 10/06 477/109 |
| 6,353,780 B1 | * | 3/2002 | Hart ..................... | B60L 15/2009 246/182 A |
| 6,385,527 B1 | | 5/2002 | Zumberge et al. | |
| 6,535,809 B1 | * | 3/2003 | Beyer .................... | B60K 28/16 180/197 |
| 6,860,253 B1 | * | 3/2005 | Barnes .................. | F02D 31/001 123/322 |
| 7,128,377 B2 | * | 10/2006 | Salamat ................ | B60T 8/1703 303/126 |
| RE39,758 E | | 8/2007 | Horst et al. | |

(Continued)

FOREIGN PATENT DOCUMENTS

| | | | | |
|---|---|---|---|---|
| CA | 2343855 A1 | * | 12/2001 | .......... B60L 15/2009 |
| WO | 2004007230 | | 1/2004 | |

*Primary Examiner* — Fadey Jabr
*Assistant Examiner* — Angelina Shudy
(74) *Attorney, Agent, or Firm* — Baker & Hostetler LLP

(57) ABSTRACT

A drivetrain system for a machine includes an engine, a brake, and a controller operatively coupled to the engine and the brake. The controller is configured to generate a first speed error based on a first speed command signal and a first ground speed signal; generate a first engine speed command signal based on the first speed error; send the first engine speed command signal to the engine; compare the first speed error to an upper threshold; set a brake command signal to an engagement value when a magnitude of the first speed error is greater than a magnitude of the upper threshold; engage the brake in response to setting the brake command signal to the engagement value; and increase a speed of the engine in response to the first engine speed command signal while the brake command signal is set to the engagement value.

20 Claims, 5 Drawing Sheets

(56) References Cited

U.S. PATENT DOCUMENTS

| | | |
|---|---|---|
| 8,260,509 B2 | 9/2012 | Reedy et al. |
| 8,744,707 B2 | 6/2014 | Li et al. |
| 8,855,876 B2 | 10/2014 | Robinson |
| 8,903,575 B2 | 12/2014 | Mischler et al. |
| 9,181,682 B2 * | 11/2015 | Anders ............... E02F 9/2058 |
| 9,381,904 B2 * | 7/2016 | Andrasko ........... B60W 10/198 |
| 2003/0205930 A1 | 11/2003 | Smart |
| 2003/0222611 A1 * | 12/2003 | Kumar ..................... H02P 3/14 |
| | | 318/375 |
| 2008/0249691 A1 * | 10/2008 | Kawaguchi ............ E02F 9/123 |
| | | 701/50 |
| 2009/0111652 A1 * | 4/2009 | Reedy ................. B60K 31/047 |
| | | 477/107 |
| 2011/0160943 A1 | 6/2011 | Yoshikawa |
| 2012/0283919 A1 * | 11/2012 | Kuras .................. B60L 11/005 |
| | | 701/50 |
| 2013/0345914 A1 | 12/2013 | Love et al. |
| 2014/0274560 A1 | 9/2014 | Tassinger et al. |
| 2014/0277860 A1 | 9/2014 | Pulliam et al. |
| 2014/0316664 A1 | 10/2014 | Anders et al. |
| 2015/0217790 A1 * | 8/2015 | Golden .............. B61L 15/0072 |
| | | 701/19 |
| 2016/0159359 A1 * | 6/2016 | Kasahara ......... F16H 61/66259 |
| | | 701/54 |

* cited by examiner

ELECTRONIC SPEED CONTROL FOR LOCOMOTIVES

TECHNICAL FIELD

This patent disclosure relates generally to a system and method for controlling a ground speed of a machine, and more particularly, to a system and method for controlling a ground speed of a locomotive using a controller operatively coupled to an engine and brake system.

BACKGROUND

Closed-loop control is known for controlling the speed of machine transmission outputs, such as the ground speed of machines, swing speeds of machine components, or other speed-controlled machine elements. Generally, closed-loop speed control operates by minimizing a difference between a desired speed and an actual speed of the machine element in question. Often, the actual speed of the controlled entity is fed back into a controller, which may implement a proportional-integral-derivative (PID) control scheme, to generate a power command signal. When applied, the power command signal may reduce the difference between the actual speed and the desired speed.

The controller typically generates the power command signal based on various gain parameters. While higher gains initially result in a more rapid response to speed change inputs, these gains may result in instability, such as continuous overshooting or ringing. For more stable speed control, a system may benefit from lower gain values. However, the resultant system may become less responsive to operator control inputs, which can lead to operator impatience and dissatisfaction, and in some cases, may also result in operator errors and inefficiencies.

U.S. Patent Application Publication No. 2014/0316664 (the '664 publication), entitled "Aggressive and Stable Speed Control," purports to address the problems of stability in control systems. The system described in the '664 publication includes a PID control module configured to periodically change the proportional, derivative, and integral gain values based on a speed error value. However, the system described in the '664 publication may not be well suited to speed control for some types of machines or some machine operating conditions. Accordingly, there is a need for improved ground speed control systems and methods to address the aforementioned problems and/or other problems known in the art.

It will be appreciated that this background description has been created to aid the reader, and is not to be taken as a concession that any of the indicated problems were themselves known in the art.

SUMMARY

According to an aspect of the disclosure, a drivetrain system for a machine comprises an engine operatively coupled to means for propelling the machine over a work surface, a brake operatively coupled to the means for propelling the machine over the work surface, and a controller operatively coupled to the engine and the brake. The controller is configured to generate a first speed error based on a first speed command signal and a first ground speed signal, generate a first engine speed command signal based on the first speed error, send the first engine speed command signal to the engine, compare the first speed error to an upper threshold, set a brake command signal to an engagement value when a magnitude of the first speed error is greater than a magnitude of the upper threshold, engage the brake in response to setting the brake command signal to the engagement value, and increase a speed of the engine in response to the first engine speed command signal while the brake command signal is set to the engagement value.

According to another aspect of the disclosure, a method for controlling a ground speed of a machine comprises generating a first speed error based on a first speed command signal and a first ground speed signal, generating a first engine speed command signal based on the first speed error, sending the first engine speed command signal from an engine speed controller to an engine of the machine, comparing the first speed error to an upper threshold via a brake controller, setting a brake command signal to an engagement value, via the brake controller, when a magnitude of the first speed error is greater than a magnitude of the upper threshold, engaging a brake of the machine in response to the setting the brake command signal to the engagement value, and increasing a speed of the engine in response to the first engine speed command signal while the brake command signal is set to the engagement value.

According to yet another aspect of the disclosure, an article of manufacture comprises non-transient machine-readable instructions encoded thereon for causing a controller to generate a first speed error based on a first speed command signal and a first ground speed signal, generate a first engine speed command signal based on the first speed error, send the first engine speed command signal from an engine speed controller to an engine of a machine, compare the first speed error to an upper threshold via a brake controller, set a brake command signal to an engagement value, via the brake controller, when a magnitude of the first speed error is greater than a magnitude of the upper threshold, engage a brake of the machine in response to setting the brake command signal to the engagement value, and increase a speed of the engine in response to the first engine speed command signal while the brake command signal is set to the engagement value.

DETAILED DESCRIPTION

Aspects of the disclosure will now be described in detail with reference to the drawings, wherein like reference numbers refer to like elements throughout, unless specified otherwise.

Figure 1:
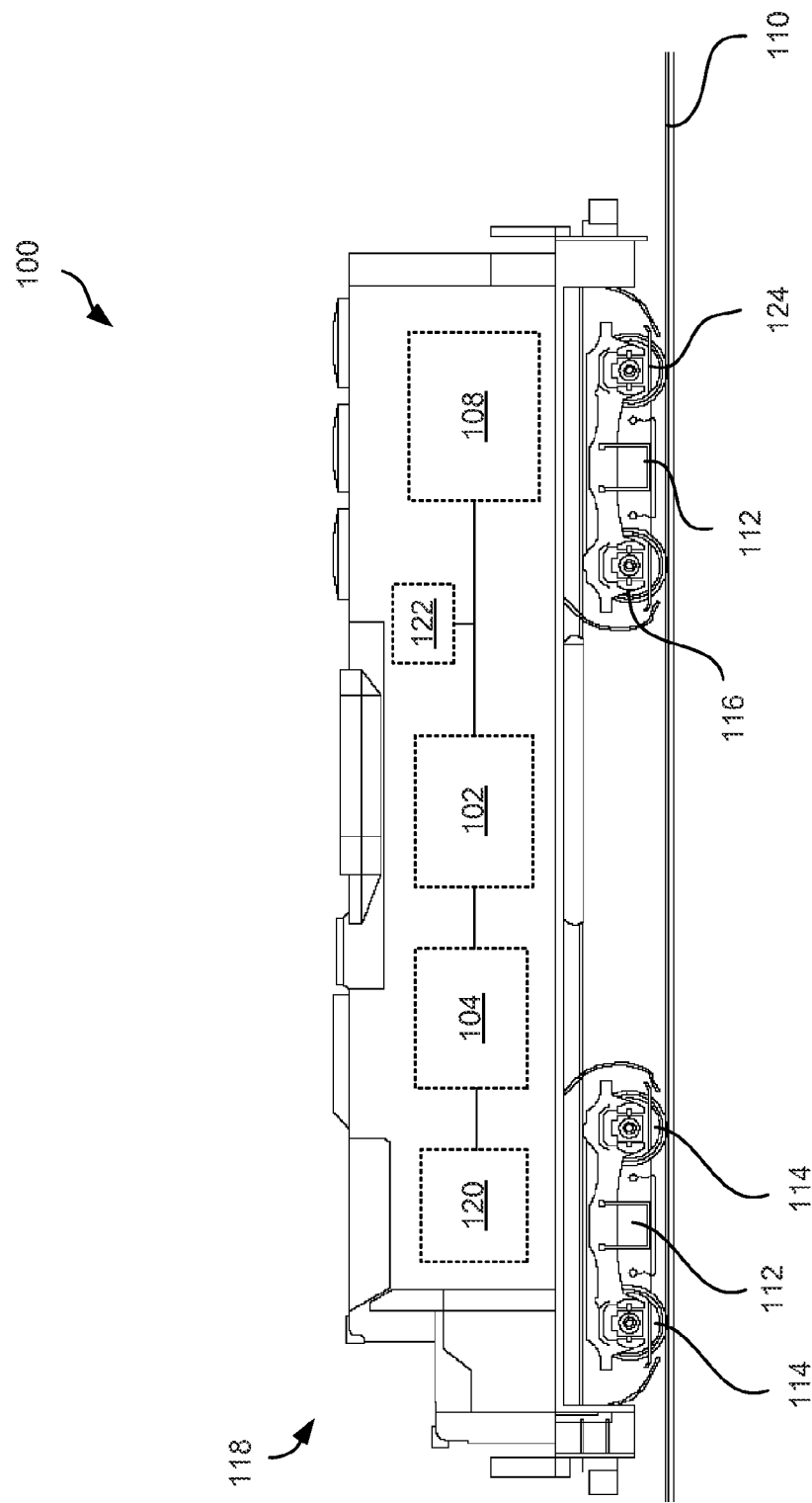
FIG. 1 is a side view of a machine, according to an aspect of the disclosure.

FIG. 1 illustrates a machine 100, according to an aspect of the disclosure. The machine 100 can be a railroad vehicle; an "over-the-road" vehicle, such as a truck used in transportation; an off-road vehicle; or may be any other type of machine that performs an operation associated with an industry such as mining, construction, farming, transportation, or any other industry known in the art. For example, the machine 100 may be an off-highway truck, a railroad locomotive, and earth-moving machine, such as a wheel loader, an excavator, a dump truck, a backhoe, a motor grader, a material handler, or the like. The specific machine 100 illustrated in FIG. 1 is a railroad locomotive.

The machine 100 includes an engine 102 operatively coupled to a controller 104. The engine 102 may be an internal combustion engine including a reciprocating piston engine, such as a compression ignition engine or a spark ignition engine, a turbomachine such as a gas turbine, combinations thereof, or any other internal combustion engine known in the art.

The engine 102 may be configured to generate a mechanical output that drives a main generator 108 to produce electric power. The electric power from the main generator 108 may be used to propel the machine 100 along a work surface 110 via one or more traction motors 112 operatively coupled with wheels 114. The traction motors 112 and/or wheels 114 may be operatively coupled to brakes 116 to provide a retarding force on the traction motors 112 and/or wheels 114. In other aspects, the engine 102 may also be operatively coupled to other means known in the art for propelling the machine 100 across the work surface 110. The electric power from the main generator 108 may also be directed to other auxiliary loads within the machine 100, such as control systems, heating, lights, fans, etc.

The machine 100 may include an operator cab 118 that includes one or more control input devices 120 that are operatively coupled to the controller 104. The control input devices 120 may include manual control input devices configured to communicate manual control inputs form an operator in the cab 118 to the controller 104; automatic control input devices such as open-loop controllers, closed-loop controllers, programmable logic controllers, and the like; remote control input devices such as wired or wireless telemetry devices; combinations thereof; or any other control input device known in the art.

The machine 100 may also include at least one engine speed sensor 122 in electronic communication with the controller 104. The engine speed sensor 122 may be operatively coupled to the engine 102 and configured to determine a speed of the engine 102, such as a crankshaft speed of the engine 102, a camshaft speed of the engine 102, or a combination thereof. The engine speed sensor 122 may be a crankshaft position sensor, a camshaft position sensor, a Hall effect sensor, an optical sensor, an inductive sensor, or another type of sensor known in the art. The engine speed sensor 122 may periodically provide an engine speed signal 238 (see FIG. 3) to controller 104. For example, the engine speed sensor 122 may output the current engine speed to the controller 104 every 20 milliseconds. The engine speed sensor 122 may also be configured to send an engine speed signal 238 when it receives a request signal from the controller 104.

The machine 100 may also include at least one ground speed sensor 124 in electronic communication with the controller 104. The ground speed sensor 124 may be operatively coupled to the traction motors 112 and/or wheels 114 and configured to determine a ground speed of the machine 100. The ground speed sensor 124 may be a wheel speed sensor including bearingless wheelset speed sensors, optical sensors, magnetic sensors, or other sensors known in the art. The ground speed sensor 124 may also periodically provide a ground speed signal 216 (see FIG. 2) to the controller 104. The ground speed sensor 124 may also be configured to send a ground speed signal 216 when it receives a request signal from the controller 104.

Figure 2:
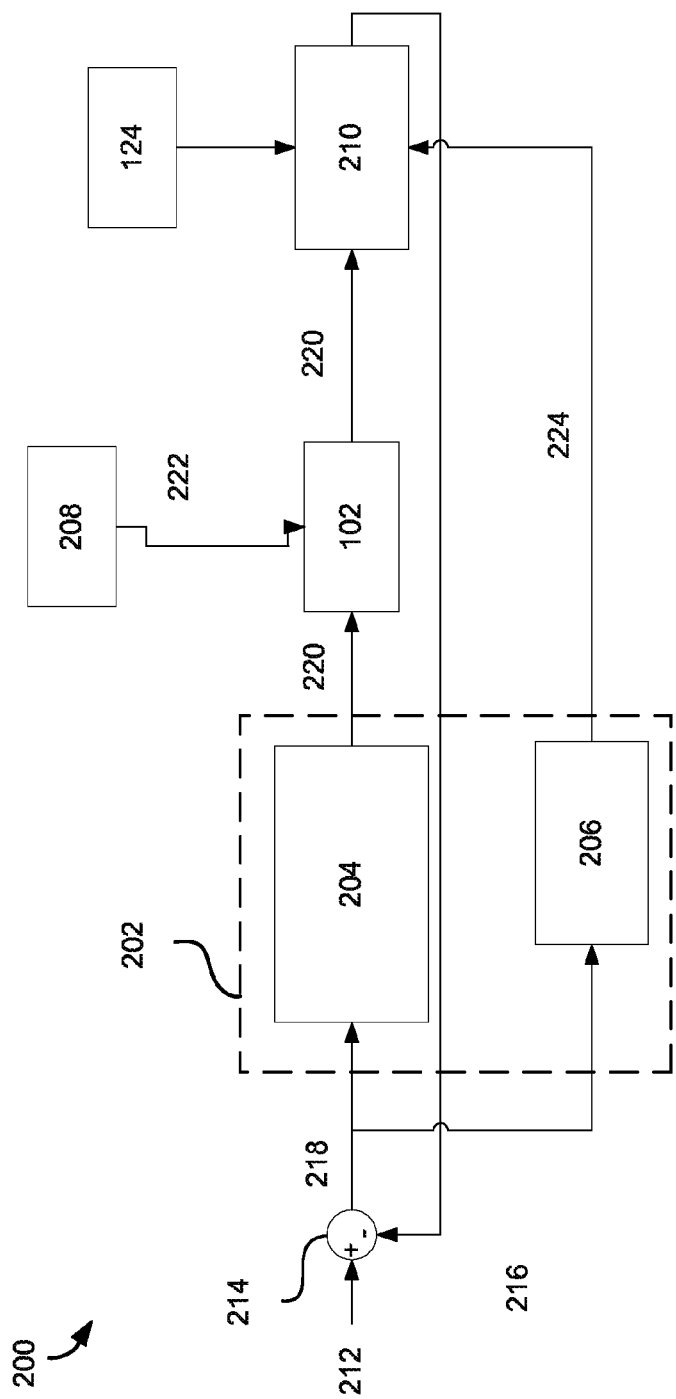
FIG. 2 is a schematic diagram of a drivetrain system, according to an aspect of the disclosure.

FIG. 2 is a schematic diagram of a drivetrain control system 200, according to an aspect of the disclosure. The drivetrain control system 200 may include a control module 202 operatively connected to the engine 102. The control module 202 may include an engine speed controller 204 and a brake controller 206. The drivetrain control system 200 may also include a throttle 208 and a vehicle dynamics module 210 operatively coupled to the engine 102. The control module 202, the engine speed controller 204, the brake controller 206, and the vehicle dynamics module 210 may be modules programmed on and/or in communication with the controller 104.

The drivetrain control system 200 may receive a speed command signal 212 at a summation block 214. The speed command signal 212 may represent a desired speed value of the machine 100 across the work surface 110. The speed command signal 212 may be superimposed at the summation block 214 with a ground speed signal 216 generated by the vehicle dynamics module 210. According to an aspect of the disclosure, the summation block 214 may inverse a sign of the ground speed signal 216 before superimposing the ground speed signal 216 with the speed command signal 212. The vehicle dynamics module 210 may be operatively connected to one or more ground speed sensors 124 in order to determine the ground speed signal 216.

The summation block 214 determines a speed error signal 218 from the speed command signal 212 and the ground speed signal 216. The speed error signal 218 may represent the difference between the current ground speed of the machine 100 and a desired ground speed of the machine 100. FIG. 2 illustrates that the speed error signal 218 is generated by superimposing the speed command signal 212 with the inverse of the ground speed signal 216. In other aspects, the speed error signal 218 may be generated by other combinations of the speed command signal 212 and ground speed signal 216. Further, it will be appreciated that superposition of the speed command signal 212 and the inverse of the ground speed signal 216 may be achieved by direct superposition of analog signals, or arithmetic operations based on magnitudes of analog signals, digital signals, or combinations thereof, for example.

The speed error signal 218 may be received by the engine speed controller 204, and the engine speed controller 204 may generate an engine speed command signal 220 based on the speed error signal 218. The engine speed command signal 220 may correspond to a desired speed of the engine 102, such as a particular revolutions per minute (RPM) of a crankshaft and/or a camshaft of the engine 102. The process for generating the engine speed command signal 220 is subsequently described in more detail with respect to FIG. 3. The engine speed command signal 220 is received by the engine 102 and used to control a speed of the engine 102.

As mentioned previously, a throttle 208 may be operatively coupled to the engine 102 and configured to send a fuel command signal 222 to the engine 102. The fuel command signal 222 may regulate a quantity of fuel injected into the engine 102. The fuel command signal 222 may be used to control a speed of the engine 102. When the drivetrain control system 200 is active, the engine speed command signal 220 may override the fuel command signal 222.

The speed error signal 218 may also be received at the brake controller 206. The brake controller 206 may generate a brake command signal 224 from the speed error signal 218. The brake command signal 224 may correspond to an engagement value or a disengagement value configured to engage or disengage, respectively, the brakes 116. The brake command signal 224 may also correspond to a variable braking force signal. For example, a magnitude of the braking force applied by the brakes 116 may be proportional to a magnitude of the brake command signal 224. Alternatively, the brake controller 206 may toggle the braking force between two discrete states, namely a disengaged state and an engaged state. The process for generating the brake command signal 224 is subsequently described in more detail with respect to FIG. 3. The brake command signal 224 is then sent from the brake controller 206 to the vehicle dynamics module 210 to control the brakes 116.

The ground speed of the machine 100 may change due to the engine speed command signal 220 and the brake command signal 224. For example, if the engine speed command signal 220 is greater than a current engine speed of the engine 102 and the brake command signal 224 is set at a disengagement value, the ground speed of the machine 100 may increase as a result of increased engine 102 power output, for example. Alternatively, if the engine speed command signal 220 is less than a current engine speed of the engine 102 and the brake command signal 224 is set at an engagement value, the ground speed of the machine 100 may decrease as a result of a retarding force of the brakes 116, a decrease in engine 102 power output, or combinations thereof. The vehicle dynamics module 210 may determine the ground speed of the machine 100 across the work surface 110 using ground speed sensors 124 and send the ground speed signal 216 to the summation block 214.

Figure 3:
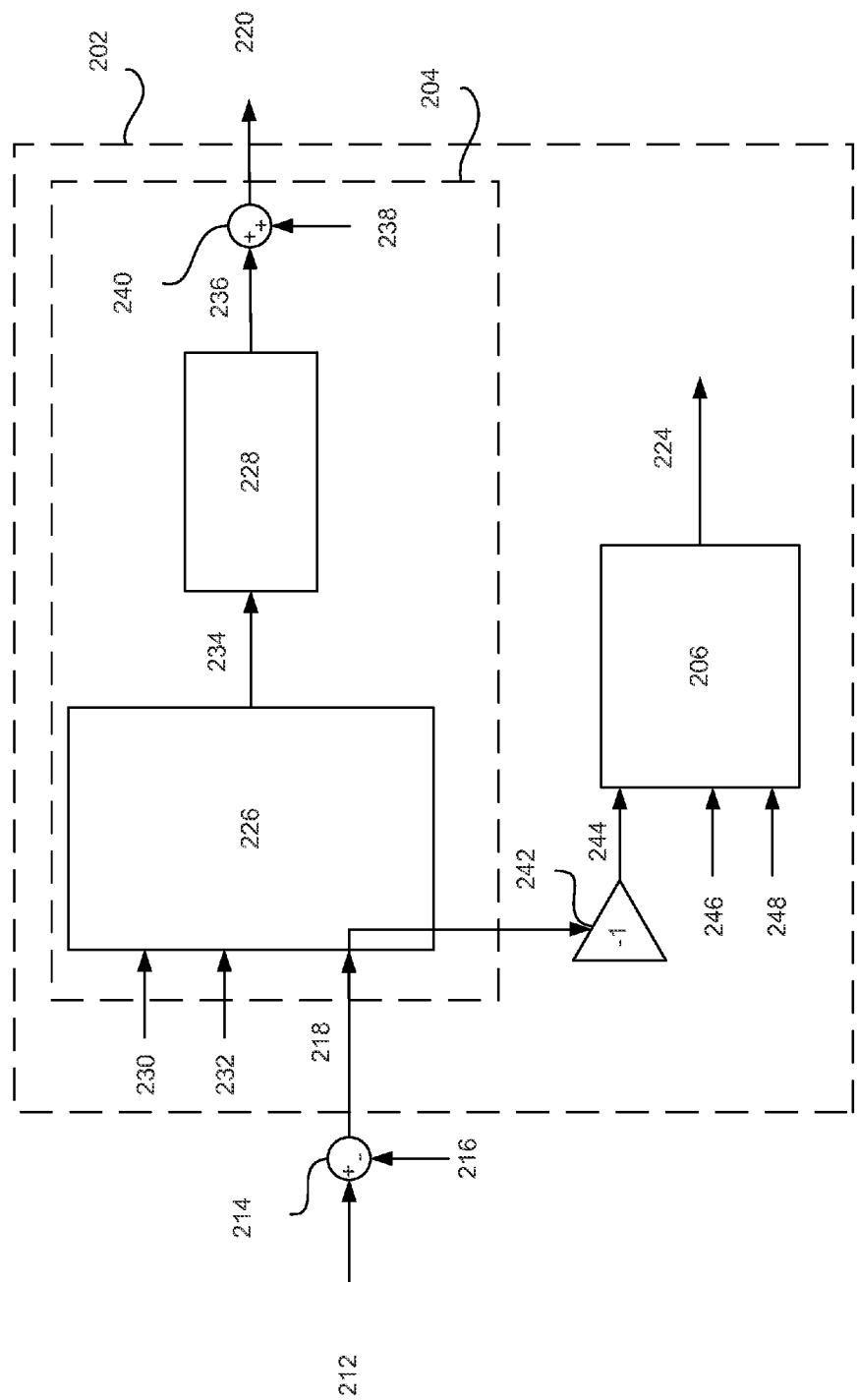
FIG. 3 is a schematic diagram of a controller, according to an aspect of the disclosure.

FIG. 3 is a schematic diagram of the control module 202, according to an aspect of the disclosure. As described previously, the control module 202 includes an engine speed controller 204 and a brake controller 206. The engine speed controller 204 may include a PD control module 226 and a variable gain module 228. The PD control module 226 may receive the speed error signal 218 from the summation block 214. The speed error signal 218 may be scaled by a proportional gain (Kp) 230 at the PD control module 226. The speed error signal 218 may also be scaled by a derivative gain (Kd) 232 at the PD control module 226. The proportional gain 230 and the derivative gain 232 may be stored in a memory of the control module 202. Further, the proportional gain 230 and the derivative gain 232 may be configured by a user. In other aspects, the control module 202 may determine the proportional gain 230 and the derivative gain 232 based on various parameters of the machine 100. Based on both the proportional gain 230 and derivative gain 232, the PD control module 226 may generate an adjusted speed error signal 234. In further aspects, the PD control module 226 may be a PID controller that is configured to generate the adjusted speed error signal 234 with an integral gain (Ki) in addition to the proportional gain 230, the derivative gain 232, or combinations thereof.

The variable gain module 228 may receive the adjusted speed error signal 234 from the PD control module 226. The variable gain module 228 may adjust the adjusted speed error signal 234 into an engine speed adjustment signal 236 that may be processed by the engine 102. According to an aspect of the disclosure, the adjusted speed error signal 234 corresponds to a ground speed error of the machine 100 and has units of speed. The engine speed adjustment signal 236 may have units of engine speed, such as revolutions per minute (RPM). The variable gain module 228 may change the units of the adjusted speed error signal 234 to a corresponding engine speed value. This scaling may be based on a number of calibration factors of the machine 100, including a gear ratio, a machine load, or other properties of the machine 100.

The engine speed adjustment signal 236 may be superimposed with an engine speed signal 238 at the summation block 240 to generate the engine speed command signal 220. As mentioned previously with respect to FIG. 2, the engine speed command signal 220 may be a desired engine speed of the engine 102. The engine speed signal 238 may be received from an engine speed sensor 122 operatively connected to the engine 102. The engine speed command signal 220 may be contained in a speed data field of a Torque/Speed Control #1 (TSC1) message of an SAE J1939 data bus communication standard. The engine speed command signal 220 may be subsequently sent to the engine 102 to control the engine speed.

As mentioned previously, the control module 202 in FIG. 3 further includes a brake controller 206. Similar to the engine speed controller 204, the brake controller 206 may receive the speed error signal 218 from the summation block 214. An inverse gain module 242 may be applied to the speed error signal 218 to generate a modified speed error signal 244. The modified speed error signal 244 may be received at the brake controller 206. In other aspects, the inverse gain module 242 may not be implemented. The brake controller 206 may also receive an upper threshold value 246 and a lower threshold value 248. The brake controller 206 may be configured to generate the brake command signal 224 based on a comparison between the modified speed error signal 244 and the upper/lower threshold values 246, 248. The brake controller 206 may set the brake command signal 224 to an engagement value when a magnitude of the modified speed error signal 244 is greater than a magnitude of the upper threshold 246. The brake controller 206 may set the brake command signal 224 to a disengagement value when a magnitude of the modified speed error signal 244 is less than a magnitude of the lower threshold 248. Further, the brake command signal 224 may remain unchanged from the previous value when the magnitude of the modified speed error 244 is between the lower threshold 248 and the upper threshold 246.

By having an upper threshold 246 greater than the lower threshold 248, the drivetrain control system 200 may effect a hysteresis loop that may help avoid instability potentially caused by switching the brake ON and OFF too rapidly. The upper threshold value 246 and lower threshold value 248 may be pre-programmed values within the control module 202. In other aspects, the upper threshold value 246 and lower threshold value 248 may be configured based on user input received at the control input devices 120.

INDUSTRIAL APPLICABILITY

The present disclosure is applicable to apparatus and methods for controlling a ground speed of a machine 100, and more particularly, to a system and method for controlling a ground speed of a locomotive using a controller operatively coupled to an engine 102 and brake system 116. Referring to FIG. 1, the machine 100 may be configured to be propelled along a work surface 110 via one or more traction motors 112 associated with wheels 114. The traction motors 112 may be directly or indirectly powered by mechanical output from the engine 102. It will be appreciated that the traction motors 112 may be indirectly powered by mechanical output form the engine 102 when the traction motors 112 receive electrical power from a generator that is driven by shaft power from the engine 102, for example.

The machine 100 may have a steady-state idle ground speed that corresponds to the engine 102 being operated at an idle condition and the brakes 116 being disengaged. For example, the machine 100 may have a steady-state idle ground speed of 5 km/hr when the engine 102 idles at 700 rpm and the brakes 116 are disengaged.

In some applications, it may be desirable to control the ground speed of the machine 100 to a value below the steady-state idle ground speed. In the previous example, it may be desirable to control a ground speed of the machine 100 to a ground speed value of 4 km/hr, which is less than the exemplary idle ground speed of 5 km/hr. Accordingly, to control the ground speed of the machine 100 below the steady-state ground speed, it may be desirable to set the brake command signal 224 to an engagement value and increase the engine speed of the machine 100 until the desired ground speed is reached.

Figure 4:
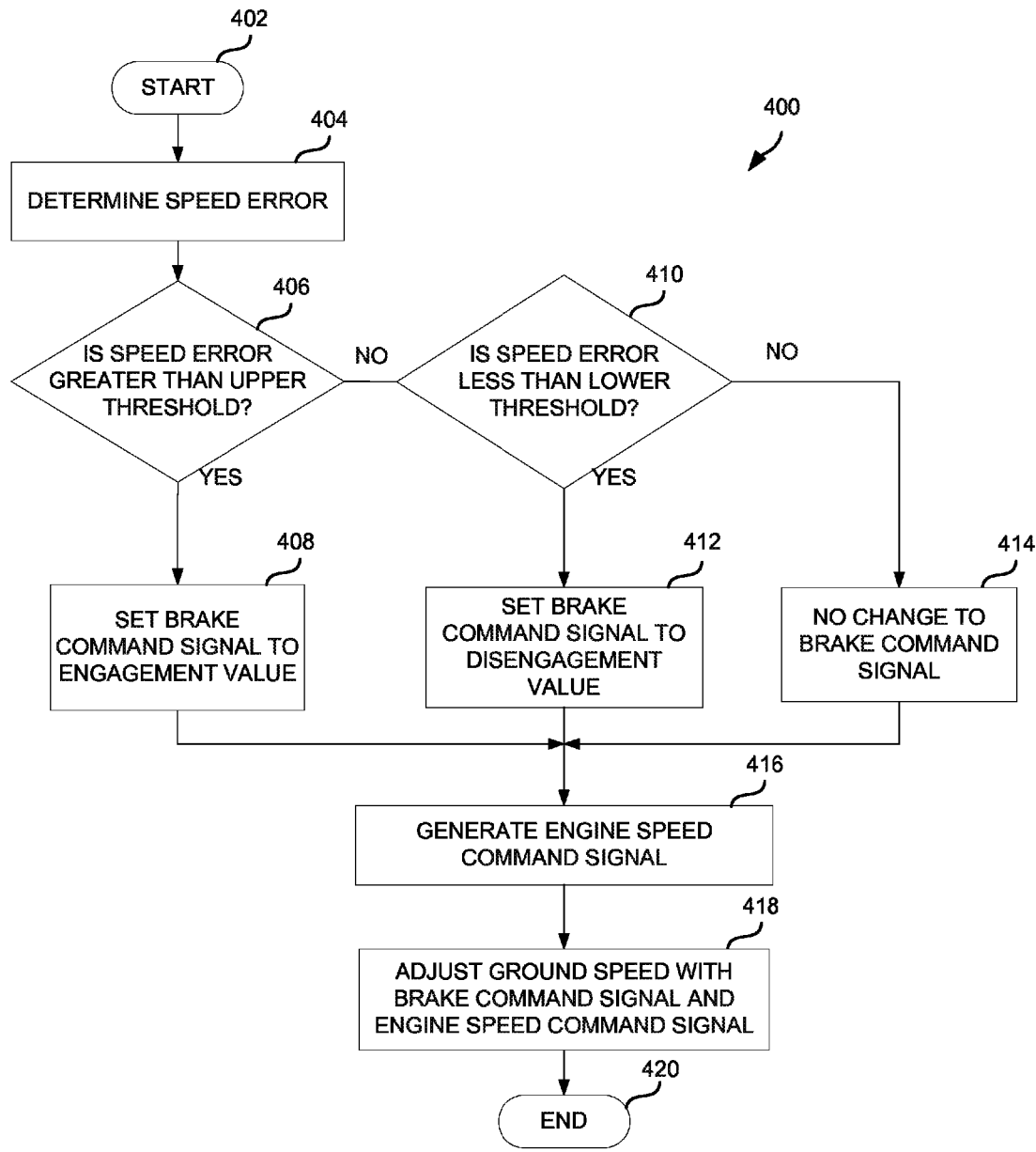
FIG. 4 is a flowchart for a process of the drivetrain system, according to an aspect of the disclosure.

FIG. 4 is a flowchart of a process 400 for the drivetrain control system 200, according to an aspect of the disclosure. The process 400 may be executed by the controller 104. The process 400 starts at step 402. In step 404, a speed error signal 218 is determined. As illustrated in FIG. 3, the speed error signal 218 may be determined based on a difference between the speed command signal 212 and the ground speed signal 216 at the summation block 214.

In step 406, the brake controller 206 determines whether a magnitude of the speed error signal 218 is greater than a magnitude of the upper threshold value 246. If the magnitude of the speed error signal 218 is greater than the magnitude of the upper threshold value 246, the process 400 proceeds to step 408, and the brake controller 206 sets the brake command signal 224 to an engagement value. If the magnitude of the speed error signal 218 is less than the magnitude of the upper threshold value 246, the process 400 proceeds to step 410. At step 410, the brake controller 206 determines whether the magnitude of the speed error signal 218 is less than a magnitude of the lower threshold value 248. If a magnitude of the speed error signal 218 is less than the magnitude of the lower threshold value 248, the process 400 proceeds to step 412, and the brake controller 206 sets the brake command signal 224 to a disengagement value. If the magnitude of the speed error signal 218 is not less than the magnitude of the lower threshold value 248, the process proceeds to step 414, and the brake controller 206 may not change the brake command signal 224. In other aspects, the brake controller 206 may complete step 410 before step 406.

From step 408, step 412, and/or step 414, the controller 104 may proceed to step 416. At step 416, the engine speed controller 204 generates the engine speed command signal 220. The process for generating the engine speed command signal 220 has been described previously with reference to FIG. 3. In other aspects, step 416 may be completed independently from steps 404-414. For example, the controller 104 may generate the engine speed command signal 220 before or while generating the brake command signal 224. The process 400 then proceeds to step 418. At step 418, the ground speed of the machine 100 may be adjusted by the engine speed command signal 220, the brake command signal 224, or both. Accordingly, the controller 104 may engage the brakes 116 and simultaneously increase or decrease a speed of the engine 102 when the target ground speed of the machine 100 is less than a steady-state idle ground speed of the machine 100. Following step 418, the process 400 ends at step 420.

Figure 5:
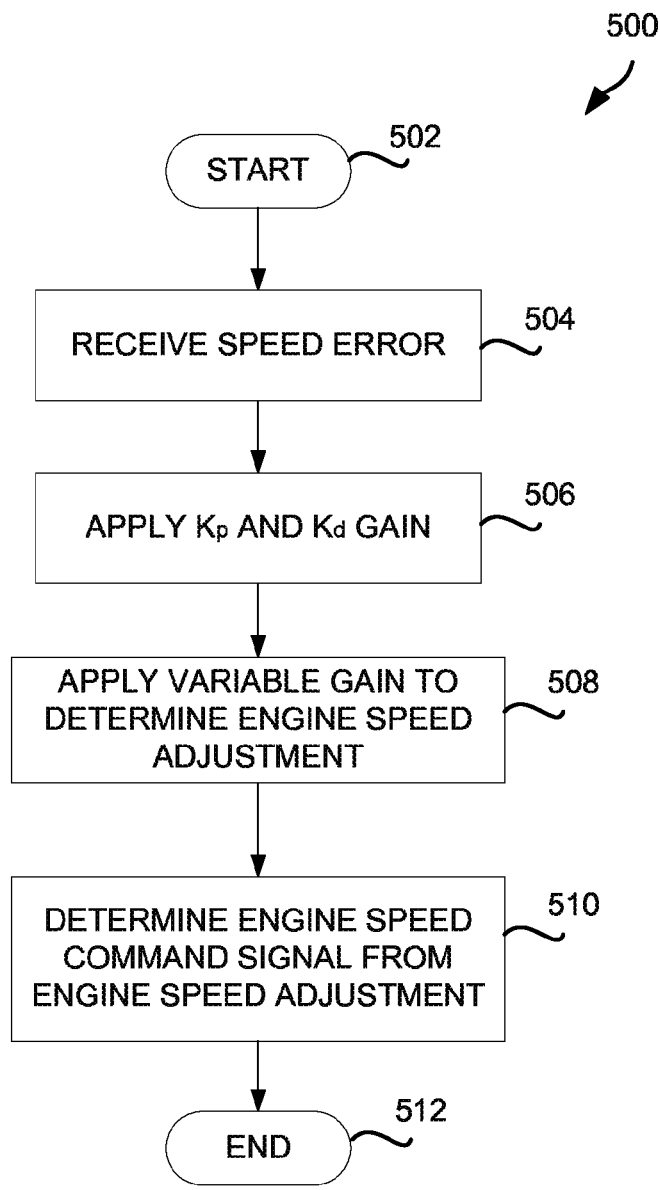
FIG. 5 is a flowchart for a process of an engine speed controller, according to an aspect of the disclosure.

FIG. 5 is a flowchart of a process 500 for the engine speed controller 204, according to an aspect of the disclosure. The process 500 starts at step 502. In step 504, a speed error signal 218 may be received at a PD control module 226. As illustrated in FIG. 3, the speed error signal 218 may be determined based on a difference between the speed command signal 212 and the ground speed signal 216 at the summation block 214. At step 506, the engine speed controller 204 applies the proportional gain 230 and the derivative gain 232 to the speed error signal 218 to generate the adjusted speed error signal 234.

At step 508, the variable gain module 228 may apply various parameters to the adjusted speed error signal 234 to generate an engine speed adjustment signal 236. At step 510, the engine speed command signal 220 may be generated by superimposing the engine speed adjustment signal 236 with an engine speed signal 238. Following step 510, the process 500 ends at step 512.

Process 400 and process 500 may be executed by the controller 104. As will be appreciated, the controller 104 may be a solid state device having a processor and optionally other resources such as memory, converters, or the like to implement one or more control functions. The controller 104 may receive one or more signal and/or command inputs, which may be digital or analog, and provide one or more output control signals in keeping with the control process implemented by the controller 104.

As used herein, the controller 104 may be a processor-based device that operates by executing computer-executable instructions read from a non-transitory computer-readable medium. The non-transitory computer-readable medium may be a hard drive, flash drive, RAM, ROM, optical memory, magnetic memory, combinations thereof, or any other machine-readable medium known in the art. The controller 104 may be single device or a plurality of devices. Further, the controller 104 may be a dedicated controller or may be implemented within an existing controller also serving one or more other functions, e.g., engine or machine speed control. It will be appreciated that any of the processes or functions described herein may be effected or controller by the controller 104.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A drivetrain system for a machine, the drivetrain system comprising:
    an engine operatively coupled to means for propelling the machine over a work surface;
    a brake operatively coupled to the means for propelling the machine over the work surface; and
    a controller operatively coupled to the engine and the brake, the controller being configured to:
        generate a first speed error based on a first speed command signal and a first ground speed signal;

generate a first engine speed command signal based on the first speed error;

send the first engine speed command signal to the engine;

compare the first speed error to an upper threshold;

set a brake command signal to an engagement value when a magnitude of the first speed error is greater than a magnitude of the upper threshold;

engage the brake in response to setting the brake command signal to the engagement value; and increase a speed of the engine in response to the first engine speed command signal while the brake command signal is set to the engagement value.

2. The system of claim 1, wherein the controller is further configured to:

generate a second speed error based on a second speed command signal and a second ground speed signal;

generate a second engine speed command signal based on the second speed error;

send the second engine speed command signal to the engine;

compare the second speed error to a lower threshold;

set the brake command signal to a disengagement value when a magnitude of the second speed error is less than a magnitude of the lower threshold;

disengage the brake in response to setting the brake command signal to the disengagement value; and adjust a speed of the engine in response to the second engine speed command signal while the brake command signal is set to the disengagement value.

3. The system of claim 2, wherein a value of the upper threshold equals a value of the lower threshold.

4. The system of claim 2, wherein a magnitude of the upper threshold is greater than a magnitude of the lower threshold.

5. The system of claim 2, wherein a value of the first ground speed signal equals a value of the second ground speed signal, and a value of the first speed command signal does not equal a value of the second speed command signal.

6. The system of claim 2, wherein a value of the first ground speed signal does not equal a value of the second ground speed signal, and a value of the first speed command signal equals a value of the second speed command signal.

7. The system of claim 2, wherein the controller is further configured to adjust at least one of the upper threshold and the lower threshold based on a user input.

8. The system of claim 1, further comprising a throttle input device operatively coupled to the controller, wherein the controller is further configured to:

generate a fuel command signal based on a throttle setting of the machine; and override the fuel command signal with the first engine speed command signal.

9. The system of claim 1, wherein the first speed command signal corresponds to a desired ground speed of the machine.

10. The system of claim 1, wherein the first engine speed command signal is contained in a speed data field of a Torque/Speed Control #1 (TSC1) message of an SAE J1939 data bus communication standard.

11. The system of claim 1, wherein the controller is further configured to determine the first engine speed command signal with a PID controller.

12. The system of claim 1, wherein a value of the first speed command signal is lower than a steady-state idle ground speed of the machine.

13. A method for controlling a ground speed of a machine, the method comprising:

generating a first speed error based on a first speed command signal and a first ground speed signal;

generating a first engine speed command signal based on the first speed error;

sending the first engine speed command signal from an engine speed controller to an engine of the machine;

comparing the first speed error to an upper threshold via a brake controller;

setting a brake command signal to an engagement value, via the brake controller, when a magnitude of the first speed error is greater than a magnitude of the upper threshold;

engaging a brake of the machine in response to the setting the brake command signal to the engagement value; and increasing a speed of the engine in response to the first engine speed command signal while the brake command signal is set to the engagement value.

14. The method of claim 13, further comprising:

generating a second speed error based on a second speed command signal and a second ground speed signal;

generating a second engine speed command signal based on the second speed error;

sending the second engine speed command signal from the engine speed controller to the engine of the machine;

comparing the second speed error to a lower threshold via the brake controller;

setting the brake command signal to a disengagement value, via the brake controller, when a magnitude of the second speed error is less than a magnitude of the lower threshold;

disengaging the brake of the machine in response to the setting the brake command signal to the disengagement value; and adjusting a speed of the engine in response to the second engine speed command signal while the brake command signal is set to the disengagement value.

15. The method of claim 14, wherein a value of the upper threshold equals a value of the lower threshold.

16. The method of claim 14, wherein a magnitude of the upper threshold is greater than a magnitude of the lower threshold.

17. The method of claim 13, further comprising:

generating a fuel command signal based on a throttle setting of the machine, via the engine speed controller; and overriding the fuel command signal with the first engine speed command signal.

18. The method of claim 13, wherein the first engine speed command signal is contained in a speed data field of a Torque/Speed Control #1 (TSC1) message of an SAE J1939 data bus communication standard.

19. The method of claim 13, wherein a value of the first speed command signal is lower than a steady-state idle ground speed of the machine.

20. An article of manufacture comprising non-transitory machine-readable media having instructions encoded thereon for causing a controller to:

generate a first speed error based on a first speed command signal and a first ground speed signal;

generate a first engine speed command signal based on the first speed error;

send the first engine speed command signal from an engine speed controller to an engine of a machine;

compare the first speed error to an upper threshold via a brake controller;

set a brake command signal to an engagement value, via the brake controller, when a magnitude of the first speed error is greater than a magnitude of the upper threshold;

engage a brake of the machine in response to setting the brake command signal to the engagement value; and increase a speed of the engine in response to the first engine speed command signal while the brake command signal is set to the engagement value.

* * * * *